G. W. SMITH.
Wheels for Vehicles.
No. 140,552.　　　　　　　　　　Patented July 1, 1873.
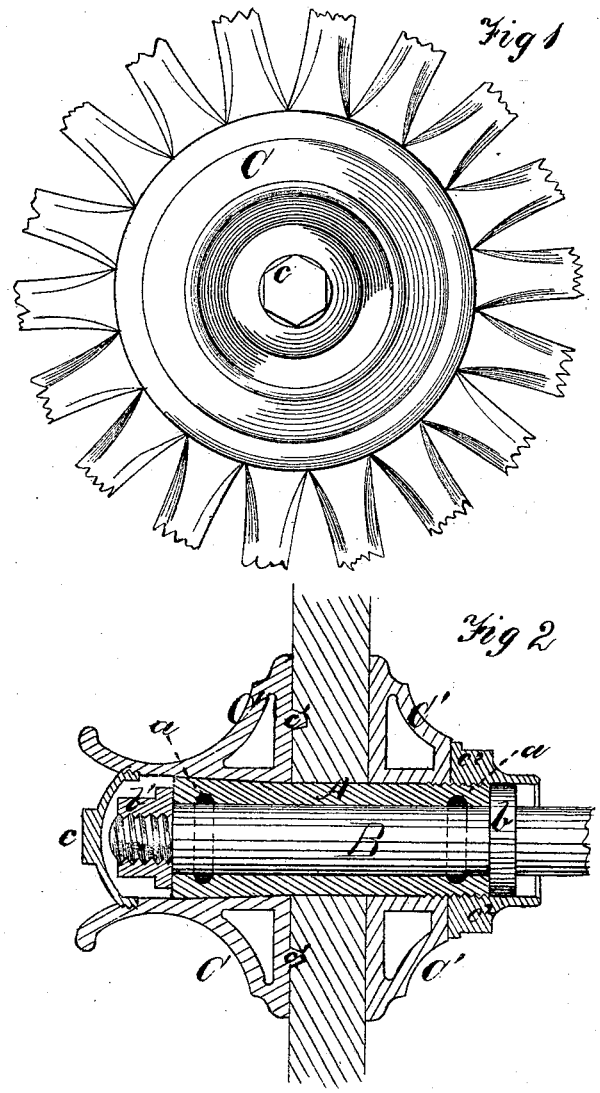

UNITED STATES PATENT OFFICE.

GEORGE W. SMITH, OF DARLINGTON, WISCONSIN.

IMPROVEMENT IN WHEELS FOR VEHICLES.

Specification forming part of Letters Patent No. 140,552, dated July 1, 1873; application filed July 11, 1872.

*To all whom it may concern:*

Be it known that I, G. W. SMITH, residing in Darlington, county of La Fayette and State of Wisconsin, have invented a certain Improvement in Hubs for Wheels, of which the following is a specification:

In the accompanying drawing, Figure 1 represents a side view of my improved hub, and Fig. 2 is a longitudinal vertical central section of the same.

Identical parts in both of the figures are designated by corresponding letters.

This invention relates to an improved hub for wheels of that class embodying means by which the spokes, instead of being held in place to the hub by insertion in mortises cut in the hub, are clamped in position within the said hub; and it consists of a box or sleeve, through which the axle passes, suitably nutted, and having its periphery supplied with an inclined surface or a bevel, in combination with an adjustable and a fixed collar, the latter being provided with an annular projection, or rim, or other suitable means for assisting in holding the spokes within the said collars, which clamp the said spokes upon either side, substantially as hereinafter more fully set forth and specifically pointed out in the claim.

To enable others to make and use my invention, I will proceed to describe it.

In the annexed drawing, A refers to a sleeve or the "box" within which fits the axle B, said axle having an annular shoulder, $b$, abutting against the inner end of the said sleeve, and supplied upon its threaded end with a nut, $b'$, which fits against the outer end of the sleeve, whereby the latter is retained in place upon the axle. The sleeve or box A is supplied with oil-chambers $a\ a$, into which the oil or other lubricating material supplied to the axle enters when the hub or wheel is at rest, obviating the losing of the same, and from which chambers it is afterward fed to the top of the axle when the wheel is in motion. These chambers also relieve the axle from some friction, and allow it to cool after becoming thus heated. The periphery of the sleeve or box A has an inclined surface, sloping from its outer end inwardly, as shown in Fig. 2, whereby the fixed collar, which is inclined upon its inner circumference so as to contract its said inner extremity, and which fits thereon, is prevented from slipping off the same and firmly held in place when pressure through the spokes is imparted thereto. C C' refer to two collars, the former of which is the fixed collar already above referred to, in part, and having its outer end symmetrically and tastefully flanged, and provided with a cap, $c$, which is adjusted thereto by means of screws cut upon it and the said fixed collar. The cap $c$ is to obviate dust, &c., entering the said collar, and also adds beauty and finish to the hub. The vertical portion of the collar C is constructed with an annular rim or projection, $c^1$, which is designed to enter an annular groove made in the spokes composing the wheel.

The collar C', which fits upon the inner end of the box or sleeve A, and constructed upon its vertical or flanged portion with a hollow bevel, by which the desired dish is given to the spokes, is susceptible of lateral adjustment, whereby the hub may be adapted to suit different sizes of spokes. The said collars are preferably made hollow, so as that the same may be manufactured of an enlarged size, and be of light construction, whereby a large surface of contact between them and the spokes is obtained and a saving of material gained. By so constructing these collars an additional advantage is gained—that of enabling the outer shells or plates, having an inclined or curved position, as clearly shown in Fig. 2, being used as braces for the angles of the said collars formed by the intersection or conjunction of their vertical and horizontal portions, whereby the said collars will be prevented from springing when in use, obviating the spokes of the wheel being loosened from wear. These collars are also thus rendered susceptible of having imparted to them any desired contour or shape.

$c^2$ is a nut fitting upon the inner or threaded end of the sleeve or box A, and is for the purpose of tightening and holding in place the adjustable collar C' against the spokes.

Having thus fully described my invention, what I claim, and desire to secure by Letters Patent, is—

The axle-sleeve A, the periphery of which forms the frustum of a cone from the spokes outward and a cylinder from the spokes inward, in combination with the hollow collars C C' having corresponding bearing-surfaces, and vertical spoke-bearing surface having the rim $c^1$ and nut $c^2$, substantially as shown and described.

In testimony whereof I have hereunto signed my name this 5th day of July, A. D. 1872, in presence of two subscribing witnesses.

GEORGE W. SMITH.

Witnesses:
 A. W. HOVEY,
 C. B. HELM.